June 8, 1926.

C. W. KNIGHT

PISTON RING

Filed Nov. 17, 1925

1,587,590

C. W. Knight
Inventor

By C. A. Snow & Co.
Attorneys

Patented June 8, 1926.

1,587,590

UNITED STATES PATENT OFFICE.

CARL W. KNIGHT, OF TIFFIN, OHIO.

PISTON RING.

Application filed November 17, 1925. Serial No. 69,648.

This invention aims to provide novel means whereby oil may pass through the wall of a piston, and through a piston ring, into the ring-groove and about the ring.

It is within the province of the disclosure to improve generally and to enhance the utility of devices of that type to which the invention appertains.

In the drawings:—

Figure 1:
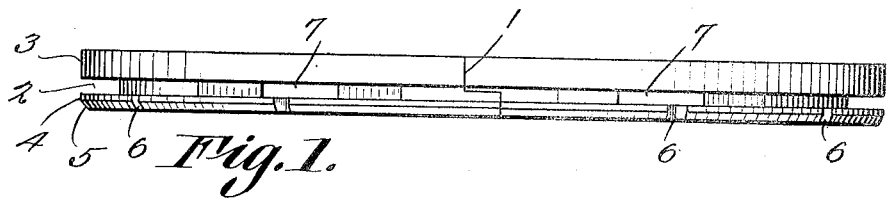
Figure 1 shows in elevation, a piston ring constructed in accordance with the invention.
Figure 2:
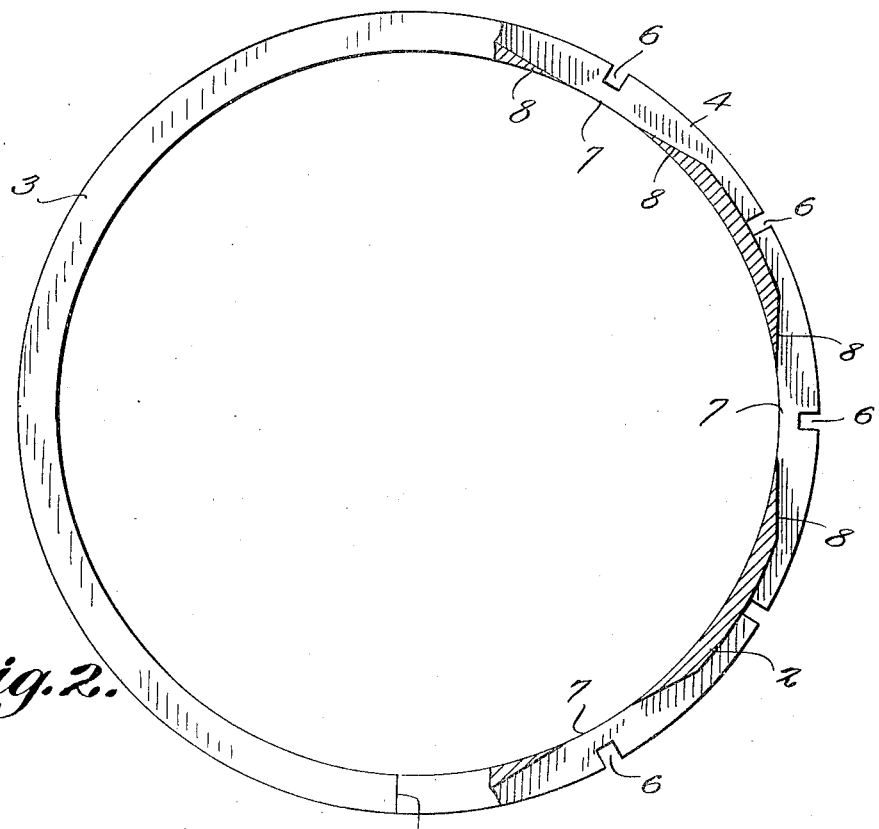
Figure 2 is a plan wherein parts are broken away.
Figure 3:
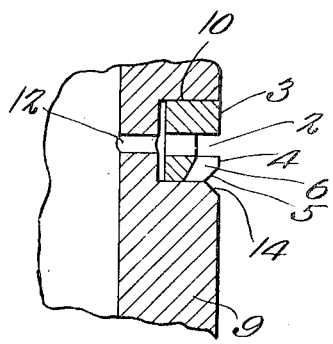
Figure 3 is a sectional view showing the ring in place in the piston of an internal combustion engine.
Figure 4:
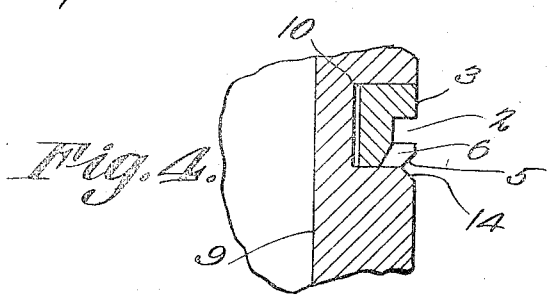
Figure 4 is a section showing a slightly different portion of the ring and the piston from that depicted in Figure 3.

The ring forming the subject matter of this application is made of resilient metal and tends to expand, the ring being divided at one point, and being halved together, as shown at 1. In its outer surface, the ring has a circumferential groove 2, forming flanges 3 and 4, the flange 3 being somewhat thicker than the flange 4, and the edge of the flange 4 being beveled or inclined toward one end of the ring, as shown at 5. There are notches 6 in the flange 4 of the ring, which promote the resiliency of the ring. Circumferentially spaced openings 7 are fashioned in the ring, at the base of the groove 2, the circumferential walls 8 of the openings 7 converging inwardly, and running out practically to nothing at the inner surface of the ring.

The numeral 9 marks a piston provided with a circumferential groove or seat 10, in which the ring is located. The piston 9 has transverse openings 12 communicating with the interior of the piston and with the groove 10. That edge of the piston 9, at the groove 10, which is adjacent to the beveled part 5 of the ring, is beveled in an opposite direction, as shown at 14.

Oil will find its way readily into the notches 6 of the ring, because the piston 9 and the ring are provided with a circumscribing groove defined by the beveled surfaces 14 and 5. The oil finds its way, from the notches 6 into the groove 2 of the ring.

What is claimed is:—

1. A piston ring provided with a circumferential groove forming flanges, one flange having notches in its edge, and the edge of that flange being inwardly beveled, the ring being provided with circumferentially spaced openings, communicating with the groove, the circumferential walls of the openings converging inwardly to the inner surface of the ring.

2. The combination with a piston having a circumscribing groove, of a piston ring mounted in the groove, the ring and the piston having cooperating beveled surfaces defining a circumferential recess, the ring being provided with a circumferential groove which forms flanges, one of the said flanges having notches communicating with the said recess.

In testimony that I claim the foregoing as my own, I have hereto affixed my signature.

CARL W. KNIGHT.